(12) United States Patent
Underseth

(10) Patent No.: US 11,526,430 B2
(45) Date of Patent: Dec. 13, 2022

(54) SYSTEM AND METHOD FOR EXECUTING MANUAL TESTS INTEGRATING AUTOMATION

(71) Applicant: S2 Technologies, Inc., Encinitas, CA (US)

(72) Inventor: Mark Underseth, Carlsbad, CA (US)

(73) Assignee: S2 Technologies, Inc., Encinitas, CA (US)

( * ) Notice: Subject to any disclaimer, the term of this patent is extended or adjusted under 35 U.S.C. 154(b) by 292 days.

(21) Appl. No.: 16/826,927

(22) Filed: Mar. 23, 2020

(65) Prior Publication Data

US 2021/0294732 A1   Sep. 23, 2021

Related U.S. Application Data

(63) Continuation of application No. 16/823,756, filed on Mar. 19, 2020.

(51) Int. Cl.
| | |
|---|---|
| G06F 3/048 | (2013.01) |
| G06F 11/36 | (2006.01) |
| G06F 3/04847 | (2022.01) |
| G06F 8/71 | (2018.01) |
| G06F 9/54 | (2006.01) |

(52) U.S. Cl.
CPC ...... *G06F 11/3688* (2013.01); *G06F 3/04847* (2013.01); *G06F 8/71* (2013.01); *G06F 9/54* (2013.01); *G06F 11/3664* (2013.01)

(58) Field of Classification Search
CPC .... G06F 11/3688; G06F 3/04847; G06F 8/71; G06F 9/54; G06F 11/3664
See application file for complete search history.

(56) References Cited

U.S. PATENT DOCUMENTS

| | | |
|---|---|---|
| 7,475,289 B2 | 1/2009 | Rosaria et al. |
| 10,162,740 B1 | 12/2018 | Setty et al. |
| 2006/0206870 A1 | 9/2006 | Moulden et al. |
| 2008/0310736 A1 | 12/2008 | Chattopadhyay et al. |

(Continued)

OTHER PUBLICATIONS

U.S. Appl. No. 16/410,806, filed Nov. 19, 2020, Mark Underseth.

(Continued)

*Primary Examiner* — Rashawn N Tillery
(74) *Attorney, Agent, or Firm* — Veros Legal Solutions, LLP (57) ABSTRACT

A test manager receives notification by a version control hosted service of one or more files, containing plain text instructions, being stored in a repository to be used for guiding a human tester to perform operations and observe behavior for a system under test. The manual test includes callable automated software, executed by a serverless computing platform, to set the system under test in a predefined state required for the manual test. The test manager is configured to display a user interface having information indicating the manual tests to be executed, including required automated software to be executed, and to provide guiding instruction for the execution of the tests. The test manager communicates with the serverless computing platform, issuing instructions regarding the required automation. The user interface is also configured to receive status information from both the human tester and the serverless computing platform.

17 Claims, 9 Drawing Sheets

(56) References Cited

U.S. PATENT DOCUMENTS

| | | | |
|---|---|---|---|
| 2009/0133000 A1* | 5/2009 | Sweis | G06F 11/3688 717/124 |
| 2011/0161425 A1 | 6/2011 | Xiao et al. | |
| 2011/0252405 A1 | 10/2011 | Meirman et al. | |
| 2012/0311541 A1 | 12/2012 | Bullard et al. | |
| 2013/0097589 A1 | 4/2013 | Bates | |
| 2013/0227351 A1 | 8/2013 | Lau et al. | |
| 2013/0227366 A1 | 8/2013 | Lau et al. | |
| 2013/0326466 A1 | 12/2013 | Rachelson et al. | |
| 2015/0089298 A1 | 3/2015 | Dhanapal et al. | |
| 2016/0132426 A1 | 5/2016 | Crawshay et al. | |
| 2016/0246706 A1 | 8/2016 | Sathyamurthy et al. | |
| 2016/0306690 A1* | 10/2016 | Underseth | G06F 11/3684 |
| 2018/0373621 A1 | 12/2018 | Tang et al. | |
| 2019/0073293 A1* | 3/2019 | Sharma | G06F 11/008 |
| 2020/0019492 A1 | 1/2020 | Fei et al. | |
| 2020/0065237 A1 | 2/2020 | Cheung et al. | |
| 2020/0183744 A1* | 6/2020 | Kim | H04L 67/10 |
| 2020/0233794 A1* | 7/2020 | Smith | G06F 11/3692 |
| 2020/0272558 A1* | 8/2020 | Li | G06F 9/44526 |
| 2020/0379895 A1* | 12/2020 | Khandelwal | G06F 11/3664 |

OTHER PUBLICATIONS

Atlassian Jira Scrum Boards, https://www.atlassian.com/software/jira/scrum-boards, downloaded May 8, 2019.

Bitbucket Version Control, https://bitbucket.org/product/features, downloaded May 8, 2019.

GitHub Project Boards, https://help.github.com/en/articles/about-project-boards, downloaded May 8, 2019.

GitHub Version Control, https://github.eom/features#code-hosting, downloaded May 8, 2019.

GitLab Jira Integration, https://about.gitlab.com/solutions/jira/, downloaded May 8, 2019.

GitLab Kanban Boards, https://about.gitlab.com/product/kanban-boards/, downloaded May 8, 2019.

GitLab Version Control, https://about.gitlab.com/product/source-code-management/, downloaded May 8, 2019.

Jira Bitbucket, https://www.atlassian.com/software/jira/bitbucket-integration?_ga=2.148414199.1953316670.1557365028-436429448.1557365028, downloaded May 8, 2019.

Trello Boards Bitbucket, https://bitbucket.org/product/features/trello-boards, downloaded May 8, 2019.

Trello Boards, https://trello.com/en, downloaded May 8, 2019.

AWS (Amazon Web Services) Lambda: Developer Guide, 2020, https://docs.aws.amazon.com/lambda/latest/dg/lambda-dg.pdf, downloaded Mar. 25, 2020, entire document.

AWS (Amazon Web Services) Code Pipeline User Guide, API Version Jul. 9, 2015, https://docs.aws.amazon.com/codepipeline/latest/userguide/codepipeline-user.pdf, downloaded Mar. 25, 2020, entire document.

Bitbucket I The Git solution for professional teams, https://bitbucket.org/, downloaded Mar. 25, 2020, entire document.

CircleCI Overview, https://circleci.com/docs/2.0/about-circleci/, downloaded Mar. 25, 2020, entire document.

CloudBees Enterprise Software Delivery Automation, https://www.cloudbees.com/software-delivery-automation, downloaded Mar. 25, 2020, entire document.

Cloudflare Workers, https://workers.cloudflare.com/, downloaded Mar. 25, 2020, entire document.

GitHub Actions, https://github.com/features/actions, downloaded Mar. 25, 2020, entire document.

GitHub CI_CD, https://github.com/features/actions, downloaded Mar. 25, 2020, entire document.

GitLab CI/CD, https://docs.gitlab.com/ee/ci/, downloaded Mar. 25, 2020, entire document.

Microsoft Azure Functions Overview, https://docs.microsoft.com/en-us/azure/azure-functions/functions-overview, downloaded Mar. 25, 2020, entire document.

Microsoft Azure Pipelines, https://docs.microsoft.com/en-us/azure/devops/pipelines/get-started/what-is-azure-pipelines?view=azure-devops, downloaded Mar. 25, 2020, entire document.

* cited by examiner

FIGURE 6

SYSTEM AND METHOD FOR EXECUTING MANUAL TESTS INTEGRATING AUTOMATION

BACKGROUND

It should be noted that this Background is not intended to be an aid in determining the scope of the claimed subject matter nor be viewed as limiting the claimed subject matter to implementations that solve any or all of the disadvantages or problems presented above. The discussion of any technology, documents, or references in this Background section should not be interpreted as an admission that the material described is prior art to any of the subject matter claimed herein.

Software teams use a variety of tools during development and a large percentage of teams rely on tools that are provided, both commercial and internally implemented, such as version control and serverless computing.

Exemplary commercially available version control hosting services include GitHub, GitLab, and Bitbucket. These examples are based on the open-source Git distributed version control tool. Git is a version control system used for managing source code, documents, and other artifacts providing a complete history and full version tracking abilities. Software development teams use version control hosting services to store their source code, along with changing history and variations of the source code called branches, in repositories.

Exemplary commercially available serverless computing platforms focused on application execution include AWS Lambda, Cloudflare Workers, and Azure Functions. Application focused serverless computing platforms provide infrastructure for application execution; part of an existing application and/or an entire application.

Exemplary commercially available serverless computing platforms focused on Continuous Integration and delivery (CI/CD) include GitHub, GitLab, Bitbucket, CircleCI, AWS CodePipeline, and CloudBees. Continuous integration and delivery (CI/CD) serverless computing platforms provide infrastructure for software teams to automate stages of application development.

Exemplary internally implemented serverless computing platforms include organizations that allocate servers and the management of their resources such as runtimes, security, etc., enabling an application to offload parts of its code execution environment and/or automate stages of application development.

For the purpose of this document, "serverless computing platform" shall be used for representing both continuous integration and development (CI/CD) computing and application execution computing, both commercially available and internally implemented.

Software development teams leverage hosted version control services to store and maintain source code. Teams also use serverless computing platforms for automating the building of the application, executing a series of tests, and optionally deploying the application onto a server, desktop, embedded device, or another type of executing device. Teams also use serverless computing platforms to execute parts of and/or an entire application.

SUMMARY

It is understood that various configurations of the subject technology will become apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary drawings and detailed descriptions are to be regarded as illustrative in nature and not as restrictive.

One aspect comprises a system for executing manual tests, using automation to set the state of the system under test, as part of the required steps for the execution of the manual tests by the human tester. The system comprises a processor; and a test manager, executing on the processor. The test manager is configured to be notified in response to the creation of a test project, and configured to identify, one or more files containing plain text instructions that are stored and maintained by a version control hosting service. The test instructions are to be executed as a manual test by a human tester on the system under test. The manual test includes callable automated software, executed by a serverless computing platform, to set the system under test in a predefined state required for the manual test. The test manager is configured to display a user interface having information indicating the manual tests to be executed, including actuatable triggers for the human tester to instruct the test manager to communicate with the serverless computing platform to execute the automated software, and to provide guiding instruction for the execution of the tests. The user interface is also configured to receive status information from the human tester and the serverless computing platform executing the automated software.

Another aspect comprises a method for writing and executing manual tests using automation to set the state of the system under test, as part of the required steps for execution of manual tests by the human tester. The method comprises receiving notification in response to the creation of a test project, and configured to identify one or more files containing plain text instructions that are stored and maintained by a version control hosting service. The test instructions are to be executed as a manual test by a human tester on the system under test. The manual test includes callable automated software, executed by a serverless computing platform, to set the system under test in a predefined state required for the manual test. The method comprises displaying a user interface having information indicating the manual test to be executed, including actuatable triggers for the human tester to communicate with the serverless computing platform to execute the automated software, and to provide guiding instruction for the execution of the tests. The method receives status information via the user interface from the human tester and is configured to receive status information from the serverless computing executing the automated software.

Yet another aspect comprises a program storage device storing instructions that when executed perform the method comprising receiving notification in response to the creation of a test project, and configured to identify one or more files containing plain text instructions that are stored and maintained by a version control hosting service. The test instructions are to be executed as manual tests by a human tester on the system under test. The manual test includes callable automated software, executed by a serverless computing platform, to set the system under test in a predefined state required for the manual test. The program storage device also includes instructions for displaying a user interface having information indicating the manual tests to be executed, including actuatable triggers for the human tester to communicate with the serverless computing platform to execute the automated software, and to provide guiding instruction for the execution of the tests. The program storage device also includes instructions for receiving status information via the user interface from the human tester and from the serverless computing platform executing the automated software.

BRIEF DESCRIPTION OF THE DRAWINGS

Various embodiments are discussed in detail in conjunction with the Figures described below, with an emphasis on highlighting the advantageous features. These embodiments are for illustrative purposes only and any scale that may be illustrated therein does not limit the scope of the technology disclosed.

FIG. 1 is a block diagram illustrating a system for retrieving and providing information to a version control hosting service and a serverless computing platform.

FIG. 2 is a block diagram representing one or more users of the version control hosting service of FIG. 1 committing plain text manual test instructions and automation descriptors as files into a repository.

FIG. 3 is a flowchart illustrating an implementation process of defining manual tests that require callable automated software using the test manager, a version control hosting service, and serverless computing platform of FIG. 1.

FIG. 3A is an exemplary screen display of the test manager of FIG. 1 that may be used to guide a user to configure/associate required callable automated software with a manual test.

FIG. 4 is a flowchart illustrating a manual execution process of running manual tests and triggering callable automated software using the test manager, a version control hosting service, and a serverless computing platform of FIG. 1.

FIG. 4a is an exemplary screen display of the input and status of testing that is performed using the test manager of FIG. 1.

FIG. 5 is a flowchart illustrating a process of extracting parameters to be used with the callable automated software using the test manager and a serverless computing platform of FIG. 1.

FIG. 6 is a flowchart illustrating a process of receiving input values from a user for parameters to be used with the callable automated software using the test manager and a serverless computing platform of FIG. 1, FIG. 7 is a flowchart illustrating a process of resolving dynamic data values for parameters to be used with the callable automated software using the test manager and a serverless computing platform of FIG. 1.

DETAILED DESCRIPTION

It is understood that various configurations of the subject technology will become apparent to those skilled in the art from the disclosure, wherein various configurations The following description and examples illustrate some exemplary implementations, embodiments, and arrangements of the disclosed invention in detail. Those of skill in the art will recognize that there are numerous variations and modifications of this invention that are encompassed by its scope. Accordingly, the description of a certain example embodiment should not be deemed to limit the scope of the present invention.

Various aspects of the novel systems, apparatuses, and methods are described more fully hereinafter with reference to the accompanying drawings. The teachings' disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the disclosure. For example, a system or an apparatus may be implemented, or a method may be practiced using any one or more of the aspects set forth herein. In addition, the scope of the disclosure is intended to cover such a system, apparatus or method which is practiced using other structure, functionality, or structure and functionality in addition to or other than the various aspects of the disclosure set forth herein. It should be understood that any aspect disclosed herein may be set forth in one or more elements of a claim. Although some benefits and advantages of the preferred aspects are mentioned, the scope of the disclosure is not intended to be limited to particular benefits, uses, or objectives. The detailed description and drawings are merely illustrative of the disclosure rather than limiting, the scope of the disclosure being defined by the appended claims and equivalents thereof.

With respect to the use of plural vs. singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that terms used herein, and especially in the appended claims (e.g., bodies of the appended claims) are intended as "open" terms unless specifically indicated otherwise (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

In those instances where a convention analogous to "at least one of A, B, and C" is used, such a construction would include systems that have A alone, B alone, C alone, A and B together without C, A and C together without B, B and C together without A, as well as A, B, and C together. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include A without B, B without A, as well as A and B together." Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Figure 1:
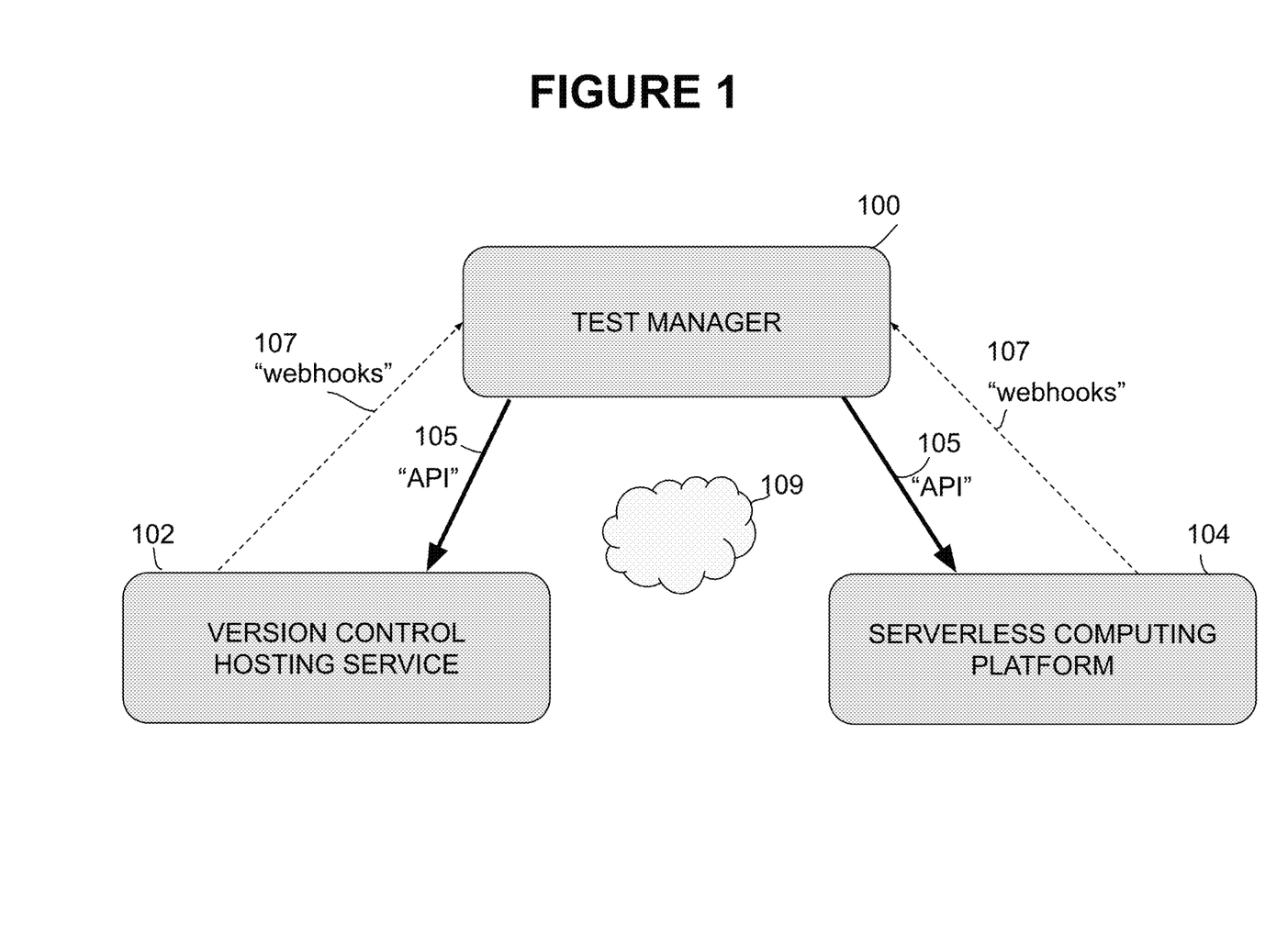

FIG. 1 is a block diagram illustrating a test manager 100 retrieving and providing information concerning a version control hosting service 102 and a serverless computing platform 104. The version control hosting service 102 can be used to store plain text instructions used for guiding a human tester to perform operations and observe behavior for a system under test. The serverless computing platform 104 can be used to set the system under test in a predefined state, required for the manual test.

The test manager 100, in one embodiment, communicates with the version control hosting service 102 and serverless computing platform 104 interfaces 105, 107 via a network 109. Version control hosting services 102 can be based on the open source Git distributed version control system, which is used, among many other features, for tracking changes in source code during software development. Examples of version control hosting services based on Git that are commercially available products, such as but not limited to are GitHub, Bitbucket, and GitLab. Serverless computing platforms 104 provide tooling and infrastructure for automating steps required in the software development process and/or the execution of all or parts of the application. Examples of serverless computing platform 104 focused on application execution that are commercially available products, such as but not limited to are AWS Lambda, Cloudflare Workers, and Azure Functions. Examples of serverless computing platforms focused on continuous integration and deployment (CI/CD) that are commercially available products, such as but not limited to are GitHub, Bitbucket, GitLab, CircleCI, AWS CodePipeline, and CloudBees. An example of internally implemented serverless computing platforms are organizations allocating servers and managing their resources such as runtimes, security, etc., enabling an application to offload parts of its code execution environment. The network 109 can include the Internet, a local area network, or a wide area network, or a virtual network being emulated on a point-to-point system.

As used herein, a test manager 100 is software that guides a human tester to run at least one manual test, from plain text instructions stored in a version control hosting service 102 for the system under test. The manual test includes callable automated software, executed by a serverless computing platform 104, to set the system under test in a predefined state required by the manual test. In one aspect, a process of placing the system under test in a predefined state is called "fixturing." For the purposes of this document, the automated software is a "fixture" used to place the system under test in a state required for the manual test. The automated software can provide status of its intended operation, including, but not limited to, pending, aborted, queued, completed, and other types of operational information, even detailing the status of test cases executed during the execution of the automated software. The automated software can include, but not limited to, setting the operating state of the system, configuring the data content of the system such as database fields and/or persisted files, and other settings affecting the system under test operating behavior.

The test manager 100 may be configured to run on a processor of a computing device, such as a desktop application, or as a server application on the Internet that is accessed by a tester via a web browser. The processor may be any conventional general-purpose single- or multi-chip microprocessor such as but not limited to a x86, x86-64, ARM64, an 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines. A human tester accesses one of more user interfaces of the test manager 100 via the network 109 and a network browser of an electronic device connected to the network 109.

The version control hosting service 102 and the serverless computing platform 104 export application programming interfaces ("API") 105 allowing 3rd parties to communicate and provide additional functionality to users of the hosting service. An exemplary API is described in the GitHub Developer Guide, https://developer.github.com/v3/, as of February 2020, which is hereby incorporated by reference in its entirety. As used herein, the API, e.g., GET, PUT, PATCH, POST, and DELETE commands may be used to extract and post information to and from the respective service. The API may also include a callback technique commonly called webhooks 107 as a mechanism by which information is provided to the test manager 100. The test manager 100, acting as a client, uses the API, to access a user's set of repositories and/or an organization's set of repositories in the version control hosting service 102. A repository is defined as a container of content such as source code. History tracking and revision control are built into the version control hosting service 102. The test manager 100, acting as a client, may also issue a request via the API to the serverless computing platform 104 to execute software. An exemplary AWS Lambda function call, to execute hosted automation software, can be invoked using a HTTP request, is described in the Amazon AWS Lambda Developer Guide, as of February 2020, which is hereby incorporated by reference in its entirety, see https://docs.aws.amazon/lambda/latest/dg/welcome.html. The exemplary API called the "dispatch" enables a 3rd party to trigger execution of automation, is described in the GitHub Developer Guide used for continuous integration and deployment (CI/CD), as of January 2020, see https://developer.github.com/v3/repos/#create-a-repository-dispatch-event.

Thus, there are generally two groups of individuals accessing the version control hosting service: human testers who access certain information from the version control hosting service 102 via the test manager 100 and software developers and/or managers who interface directly with an interface of a web portal of the version control hosting service 102. A software developer and/or manager of the version control hosting service 102 may access the service via the network 109 and use a network browser of an electronic device of the developer. Unless proscribed by an organization, a direct user of the version control hosting service is not precluded from accessing the version control hosting service information 102 via the test manager 100 and vice versa. As used herein, a "user of the version control hosting service" refers to an individual who accesses the version control hosting service information 102 directly via a web portal of the version control hosting service 102.

The content of the serverless computing platform 104 is generally accessed by software developers and/or managers who interface directly with an interface of a web portal and/or command line interface (CLI) of the serverless computing platform 104. A software developer and/or manager may access the serverless computing platform 104 via the network 109 and using a network browser/CLI of an electronic device of the developer. Unless proscribed by an organization, a direct user of the serverless computing platform is not precluded from accessing the serverless computing platform 104 via the test manager 100 and vice versa. As used herein, a "user of the serverless computing platform" refers to an individual who accesses the serverless computing information 104 directly via a web portal/CLI of the serverless computing platform 104.

The hosting services 102, 104 and the test manager 100 can be provided by a single commercial product or by multiple commercial products. For example, in one embodiment, the version control hosting service 102 and the serverless computing platform 104 are integrated into a single application and the test manager 100 configured as a separate application communicates with the services of each of them via an API provided by the single integrated application. In another embodiment, each of the version control hosting service 102, the serverless computing platform 104, and the test manager 100 are integrated into a single application and the respective services are invoked by the services of the other via an internal API or otherwise directly invoked via a private link, API, port, or communication channel. In another embodiment, the version control hosting service 102 and test manager 100 are integrated into a single application package and communicate with the serverless computing platform 104 via an interface such as described above. In yet another embodiment, the serverless computing 104 and test manager 100 are integrated into a single application package and communicate with the version control hosting service 102 via an interface such as described above.

Figure 2:
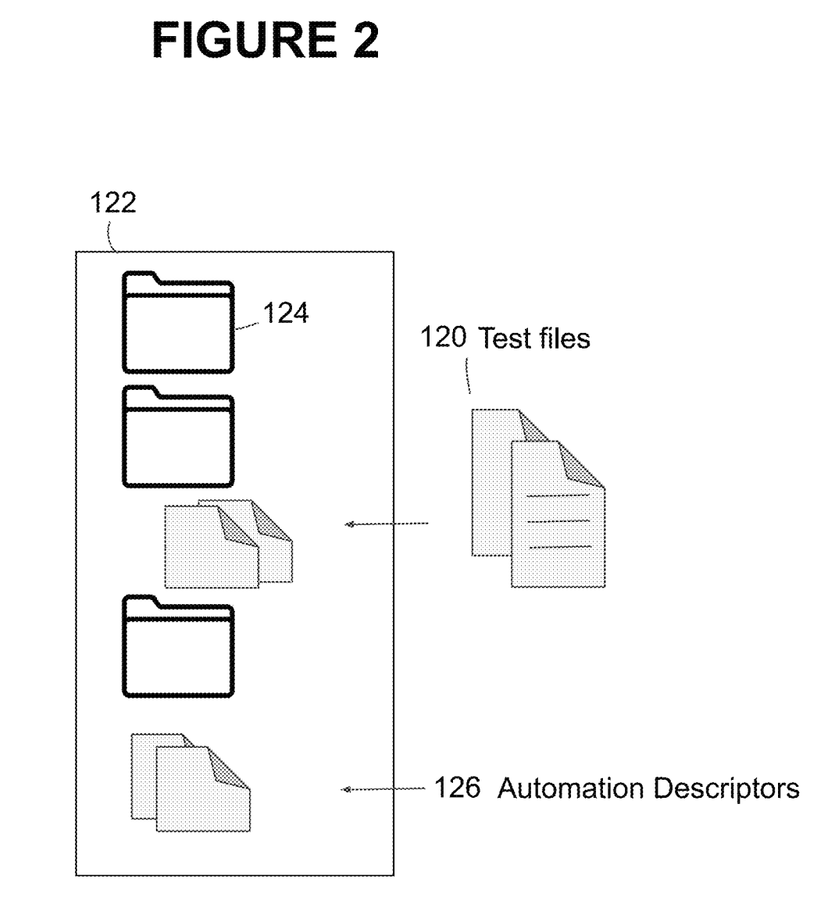

FIG. 2 is a block diagram representing one or more users of a version control hosting service 102 committing files 120, 126 into a repository 122. Test files 120 are written instructions using a readable language in plain text, providing a set of instructions for testing software manually and/or calling automated software to be executed by a serverless computing platform 104. Test files 120 containing textual instructions are handled exactly the same as files containing textual based programming language instructions (e.g. source code) when being stored and maintained in a repository 122. The test files 120 can be organized and version controlled within folders/sub-folders 124 and separate branches of the repository 122. A branch is a controlled variation of an existing baseline within a repository. As will be described further below, the test manager 100 may be used to extract the test files 120 from the repository 122 and convey information about the test files 120 with the test files containing required automated software "calls" to be executed by a serverless computing platform 104. In one embodiment, the test files 120 are plain text files using a lightweight markup language such as, but not limited to, markdown or textile, defining one or more software automation calls and/or operations to be performed on the system under test by a human tester. In another embodiment, the test files 120 are plain text files using a business driven development language format, but not limited to, such as Gherkin. In one embodiment the test files 120 can define the required callable automated software by referencing an automation descriptor 126 within the test files 120. Automation descriptors can be represented by textual description within the test file 120, by an external file 126, and/or within the user interface, and are used to define the callable automated software identifier, payload, and other attributes required when triggering the software automation to be executed by the serverless computing platform 104. An automation descriptor, and the service computing platform 104 API, are used for calling the software automation. Automation descriptors, when represented by files 126 can be organized and version controlled within folders/sub-folders 124 and separate branches of the repository 122. In one embodiment, automation descriptors follow prescribed syntax as defined by the serverless computing platform. The system under test could be maintained with the same repository 122, or elsewhere.

Figure 3:
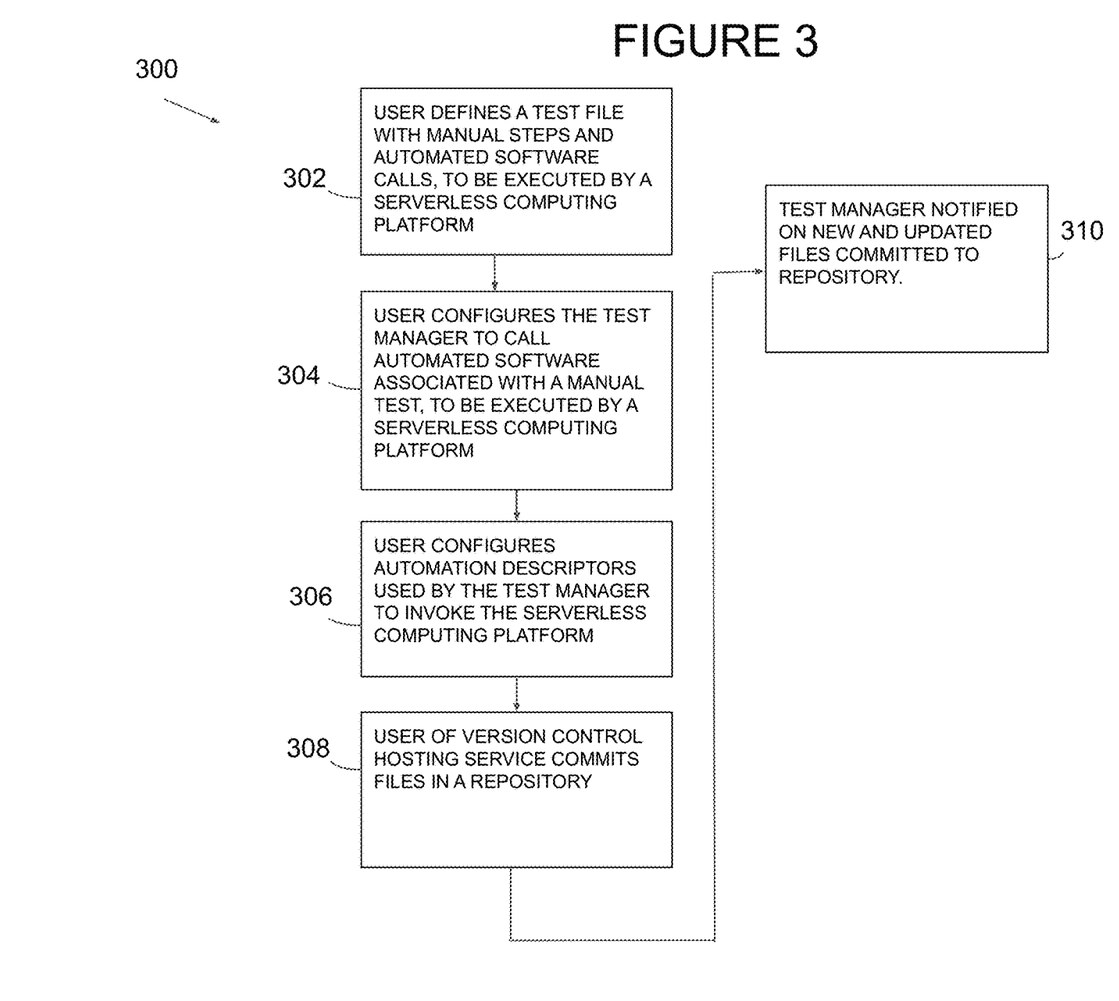

FIG. 3 is a flowchart illustrating a test implementation process of manual steps creation with required callable software automation. The flow includes defining manual steps for the human tester, defining automated software to be called directly or indirectly by the human tester, configuring automation descriptors used to invoke callable software automation to be executed by the serverless computing platform 104, file storage using the version control hosting service 102, and automatic discovery of test files maintained and updated within the version control hosting service 102 by the test manager 100. Depending on the embodiment, the hosting services can be provided by a single commercial product or by separate commercial products. Also, additional steps may be added, others removed, and the ordering of the steps rearranged.

Starting at step 302 a user defines a test file consisting of manual test steps and automated software calls, to be executed by the serverless computing platform 104.

Set forth below is a certain exemplary test file that may be used to define test steps including both manual test steps and automated software calls:

```
# MY TEST
This test covers very important stuff.
FIRST CHECK THIS
Verifies that stuff comes up as expected
- <run::turnOn-gadget>
- Now check if gadget is online
- Determine if gadget dashboard displaying "OK"
- <run::turnOff-gadget>
- Now check if gadget is offline
```

The character "#" indicates the start of a test definition followed by the name of the test. The character set "##" indicates a specific case to be verified. The keyword "run::" indicates specific software automation to be executed by a serverless computing platform 104. The following bullets are manual test steps required by the human tester to verify. The characters and keywords used for instructions are examples only and other text based indicators may be used. Also, additional steps, both manual and automated, may be added, others removed, and the ordering of the steps rearranged. The number of tests and/or cases, represented by "#" and "##", may be added, removed, or rearranged.

Continuing at step 304 the user has the option to use the test manager 100 to initiate automated software calls on the creation, termination, and/or during the execution of the manual test, to be executed by the serverless computing platform 104.

Figure 3A:
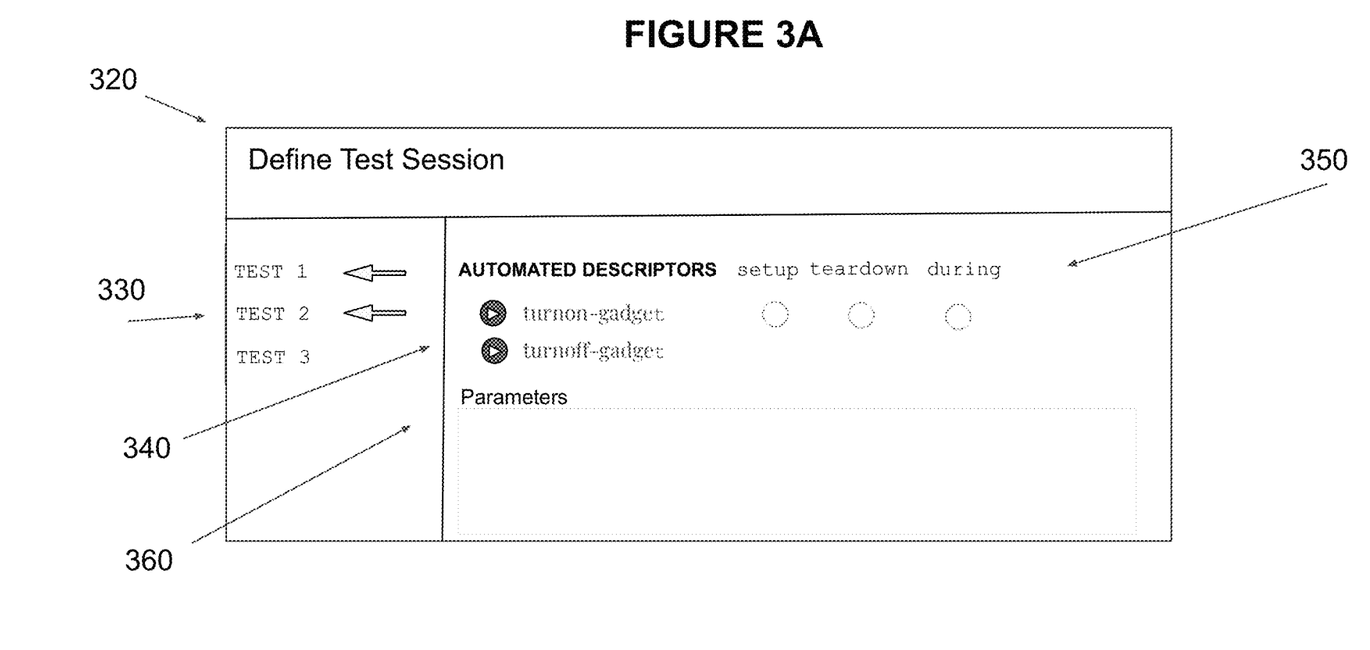

FIG. 3A is an exemplary user interface screen display 320 of the test manager 100 configuration used to associate callable automated software with a manual test. Using the test manager 100, a user can define what set of tests 330 require automated software as part of the test, and associate the required software automation with the test 330. The callable automated software can be selected to be executed before (setup), after (teardown), and/or during 350 the human tester execution of one or more manual tests 320 and/or manual test steps.

Continuing at step 306 the user configures an automation descriptor to be used by the test manager 100 when invoking a serverless computing platform 104 to execute automated software. Set forth below is a certain exemplary automation descriptor for executing software using GitHub, a serverless computing platform focused on continuous integration and delivery (CI/CD). The test manager 100 uses the automation descriptor when constructing the API using the dispatch event, as described in the repository dispatch event, https://developer.github.com/v3/repos/#create-a-repository-dispatch-event. The repository dispatch event can be used to schedule the automated software contained in a workflow to be executed by the serverless computing platform 104.

```
{
    "service": "github",
    "repo": "myorg/myrepo",
    "name": "turnon-gadget.yml",
    "payload": "{
        "start": "later",
        "end": "soon"
    }",
}
```

The keyword "service" indicates the serverless computing platform 104 being used to execute the automated software.

The "repo" keyword indicates where the workflow to execute is stored within GitHub. The "name" represents a specific workflow to execute. The "payload" is used to represent the set of available parameters used for controlling the behavior of the callable automated software. The automation descriptor may be represented by plain text, a file and optionally maintained in the repository 126. The automation descriptor may also be configured and maintained by a user interface of the test manager 100. The keywords used for describing the callable automated software are examples only and other indicators may be used. Also, additional descriptor fields may be added, others removed, and the ordering of fields rearranged.

Set forth below is a certain exemplary GitHub workflow used to contain callable software automation, as represented with a YAML (Human-readable data-serialization language) file,

```
name: turnon-gadget
on: repository_dispatch
jobs:
    job1:
        runs-on: ubuntu-latest
        steps:
            - name: Install JavaScript dependencies
              run: |
                npm install ci
            - name: Run script to turn on gadget
              run: |
                node scripts/gadgeton.js
```

The keyword "name" at the top indicates the symbolic tag for the automation steps to be executed by the GitHub serverless computing platform 104. The "on" keyword indicates the event type used to trigger the execution. The automation can be organized in separate jobs, each running simultaneously. The following instructions perform installation steps, in this example used for a JavaScript associated file. The "gadgeton.js" script is used to automate steps for turning on the gadget being verified. The keywords used are for GitHub only and other serverless computing platforms specify their required syntax. The example is described in GitHub Help documentation, https://help.github.com/en/actions/automating-your-workflow-with-github-actions/workflow-syntax-for-github-actions, as of January 2020, which is hereby incorporated by reference in its entirety.

Set forth below is another exemplary automation descriptor that can be used for AWS Lambda, a serverless computing platform focused on application execution. An AWS Lambda function, described in the AWS documentation guide https://docs.aws.amazon.com/lambda/latest/dg/resource-model.html, as of February 2020, which is hereby incorporated by reference in its entirety. The test manager 100 uses the automation descriptor and the AWS API, when invoking the automated software, as described here, https://docs.aws.amazon.com/lambda/latest/dg/lambda-invocation.html,

```
{
    "service": "aws",
    "region": "west-2"
    "name": "turnon-gadget-xyzB12x",
    "payload": "{
        "start": "later",
        "end": "soon"
    }",
}
```

The keyword "service" indicates the serverless computing platform 104 being used to execute the automated software. The "region" keyword indicates where the function is stored within AWS server global locations worldwide. The "name" represents a specific named URL required to invoke the function. The "payload" is used to represent the set of available parameters used for controlling the behavior of the callable automated software. The automation descriptor may be represented by plain text, a file and optionally maintained in the repository 126. The automation descriptor may also be configured and maintained by a user interface of the test manager 100. The keywords used for naming the callable automated software are examples only and other indicators may be used. Also, additional descriptor fields may be added, others removed, and the ordering of fields rearranged.

Continuing at step 308, a user of the version control hosting service commits files 120, 126 in a repository 122. The test files 120 are plain text files using a lightweight markup language such as, but not limited to, markdown or textile, defining one or more callable automated software operations and human tester operations to be performed on the system under test. The test files 120 themselves can reference, but not limited to, external links and images. Images can be stored in the repository 122 or elsewhere. The automation descriptors 126 themselves can reference, but not limited to, other files that can be stored in the repository 126 or elsewhere.

Continuing to a step 310, the version control hosting service 102 notifies the test manager 100 of the existence of changes to the files within the repository. Files can be added, removed, or modified. In one embodiment, the test manager 100 previously registered, via an application programming interface ("API"), with the version control hosting service 102 to receive a notification via a webhook 107 when a new commit of changes occurs within the repository.

Figure 4:
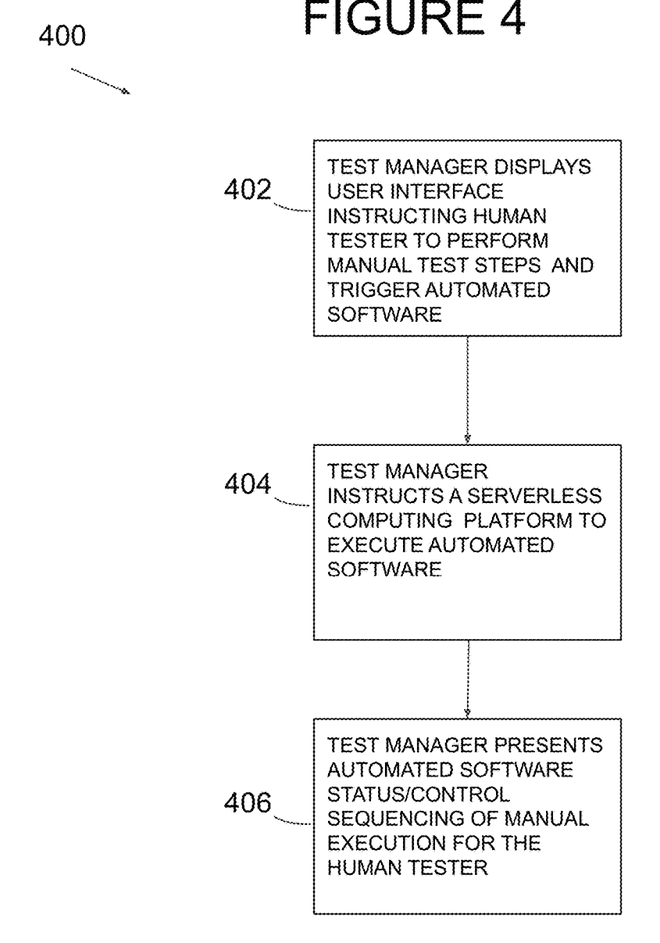

FIG. 4 is a flowchart illustrating a test execution process of manual testing integrated with callable automated software setting the state of the system under test. The flow includes retrieving test files 120 from the version control hosting service 102 and presenting on the test manager 100 guiding instructions for a human tester. The test manager 100 visually indicates steps that require human verification and steps requiring the calling of automated software execution. When automated software is triggered by the human tester, the test manager 100 generates a call to the serverless computing platform 104 to execute the automated software. The test manager 100 presents the status of the automation and allows manual steps status to be entered. Depending on the embodiment, the version control hosting services and serverless computing platform can be provided by a single commercial product or by separate commercial products. Also, additional steps may be added, others removed, and the ordering of the steps rearranged.

Starting at step 402, the test manager 100, in one embodiment, utilizing the API of the version control hosting service 102, extracts a copy of the test files 120 in the repository 122. The test manager 100 displays a user interface 410 (FIG. 4A) that includes information guiding a tester to perform operations and observe behavior based on the extracted test files from the version control hosting service 102. The user interface can include: a window displaying the name of the tests, a graphical control to trigger the execution of automated software, a form allowing the tester to specify whether the test passed or failed, and any notes the tester may have regarding the execution of the test. The user interface, example screen FIG. 4A, can also be adapted to show the status of currently executing automated software to be viewed by the tester, control when manual test steps can be executed, allowing sequencing of dependent manual steps.

Next, at step 404, the test manager 100 instructs, in one embodiment, via the application programming interface, the serverless computing platform 104 to execute software automation as defined by the automation descriptor file 126, contained in the Repository 122, user interface, or elsewhere.

Moving to step 406, in one embodiment, the status of the automated software is presented to the human testers via the user interface. The user interface, exemplary screen FIG. 4A, displays the automation software execution status 416 such as "queued", "in progress", "success", or "failed."

Figure 4A:
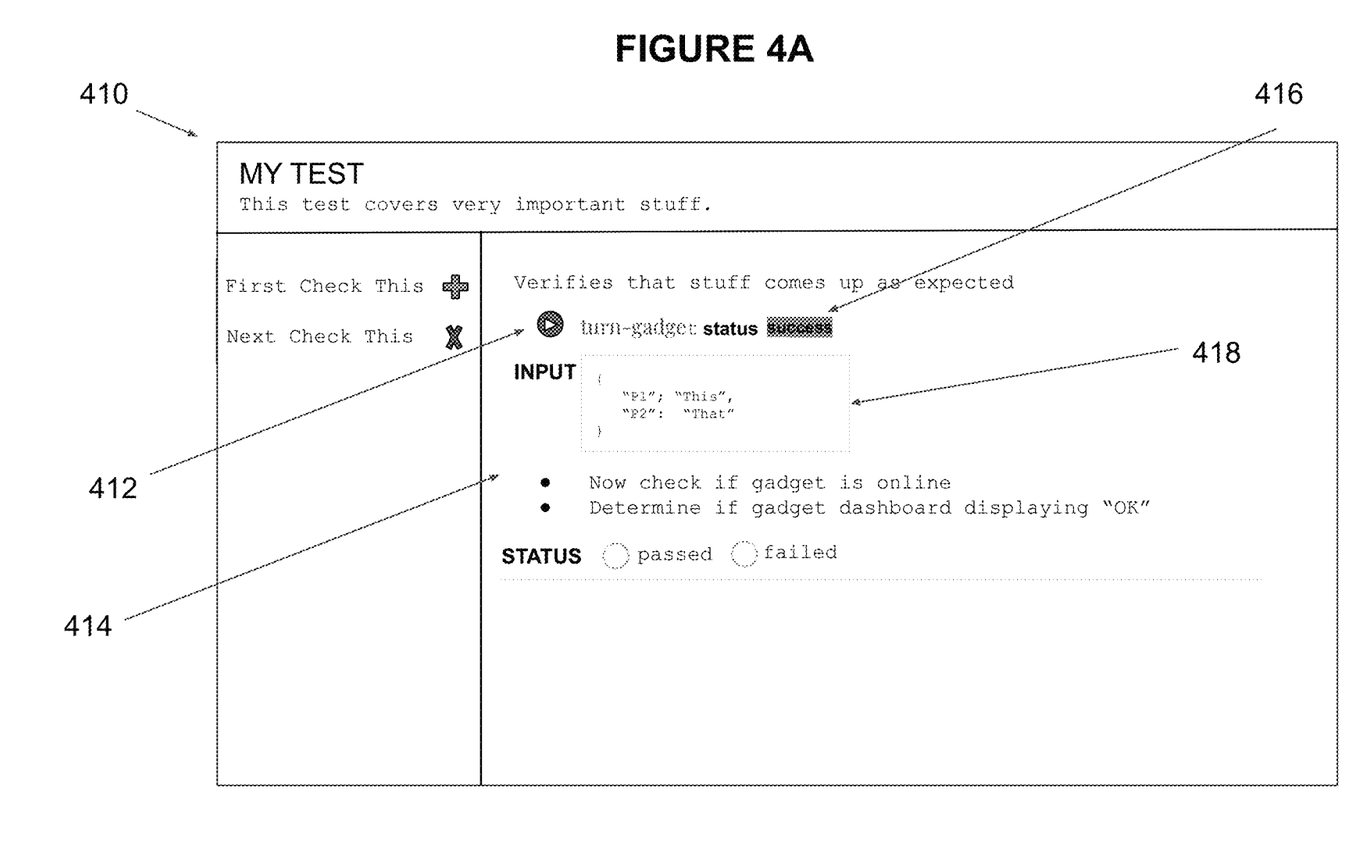

FIG. 4A is an exemplary screen display 410 of the test manager 100 that may be used to guide a human tester to execute a specific test. In one embodiment, the displayed name of each of the tests is selectable via a link and upon selection displays further information regarding each test case of the respective test. Using the test manager 100, the human tester can trigger the execution of each of the test cases, including the callable automated software 412, indicate whether the test case passed or failed, optionally provide observational information 414, and assess the status of automated software 416, regarding the execution of the test.

In one embodiment, when a manual test requires automated software to be executed by an serverless computing platform 104, parameters can be declared within the test manager 100 configuration (FIG. 3A) 360 and/or within the test file. Set forth below is a certain exemplary test file that may be used to define test steps including both manual and automated, wherein the callable automated software accepts parameters:

```
# MY TEST
This test covers very important stuff.
FIRST CHECK THIS
Verifies that stuff comes up as expected
- <run::turnon-gadget>
    {
        "this": "hey",
        "what": true
    }
- Now check if gadget is online
- Determine if gadget dashboard displaying "OK"
```

The above character sequence "{ . . . }" includes fields which define name value pairs. The first parameter name is "this", with the associated value of "hey." The second parameter name is "what" and has a value of "true." There are no limits to the number of parameters. The characters and keywords used for instructions are explarmary only and other text based indicators may be used.

Set forth below is another certain exemplary test file that may be used to define test steps including both manual and automated, whereas the callable automated software accepts parameters whose values are defined in a separate file:

```
# MY TEST
This test covers very important stuff.
FIRST CHECK THIS
Verifies that stuff comes up as expected
- <run::turnon-gadget:/.github/workflows/input1.json>
- Now check if gadget is online
- Determine if gadget dashboard displaying "OK"
```

The character sequence ":/path/to/file" is used to reference a file containing parameters, versus declaring them explicitly in the test file. There are no limits to the number of parameters contained in the test file. The syntax used to reference the file is used for instructions only and other techniques may be used.

Figure 5:
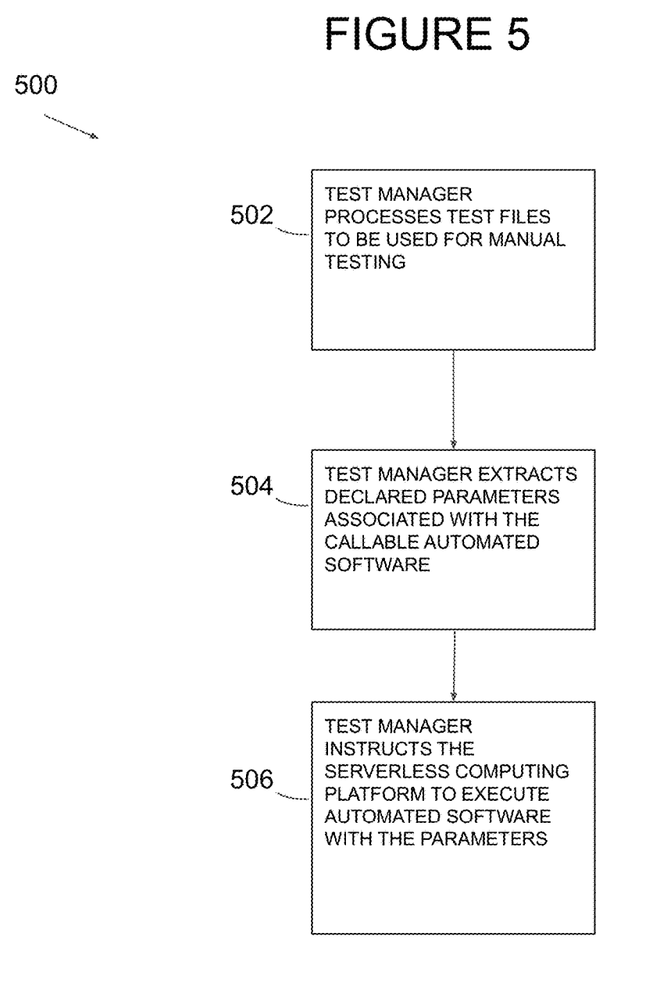

FIG. 5 is a flowchart illustrating a test execution process of callable automated software accepting parameters. The flow includes a test retrieved from the version control hosting service 102 with defined callable automated software that include declared parameters within the test file and/or referencing an externally defined file also maintained in file storage using the version control hosting service 102, or elsewhere. Another method available is extraction of parameters from the test manager's user interface configuration (FIG. 3A) 360. A user can define specific parameters to be associated with the callable automated software 340. The test manager extracts the parameters and provides the information as parameters 360 to be used for controlling the behavior of the automated software being executed by the serverless computing platform 104.

Starting at step 502, the test manager 100, in one embodiment, utilizing the API of the version control hosting service 102, extracts a copy of the test files 120 in the repository 122.

Next at step 504, the test manager 100, identifies and copies the defined parameters declared or referenced via external file within the text file and/or configured within the user interface 360 of the test manager 100.

Continuing to a step 506, the test manager 100, in one embodiment, via the application programming interface, the serverless computing platform 104 to execute software automation as defined by the automation descriptor file 126, contained in the Repository 122, user interface, or elsewhere. The test manager provides additional information representing the input parameters. An exemplary GitHub workflow, used as callable software automation, as described in https://developer.github.com/v3/repos/#create-a-repository-dispatch-event, using the "client_payload" within the dispatch event to provide parameters to control the automated software executed by the serverless computing platform 104.

In one embodiment, when a manual test requires automated software to be executed by a serverless computing platform 104, parameters declared within the test manager 100 configuration (FIG. 3A) 360 and/or within the test file, the input values can be provided by the human tester (FIG. 4A) 418. The user entered values during the execution of the manual test are sent as parameters to the callable automated software, controlling its behavior, being executed by the serverless computing platform 104.

Figure 6:
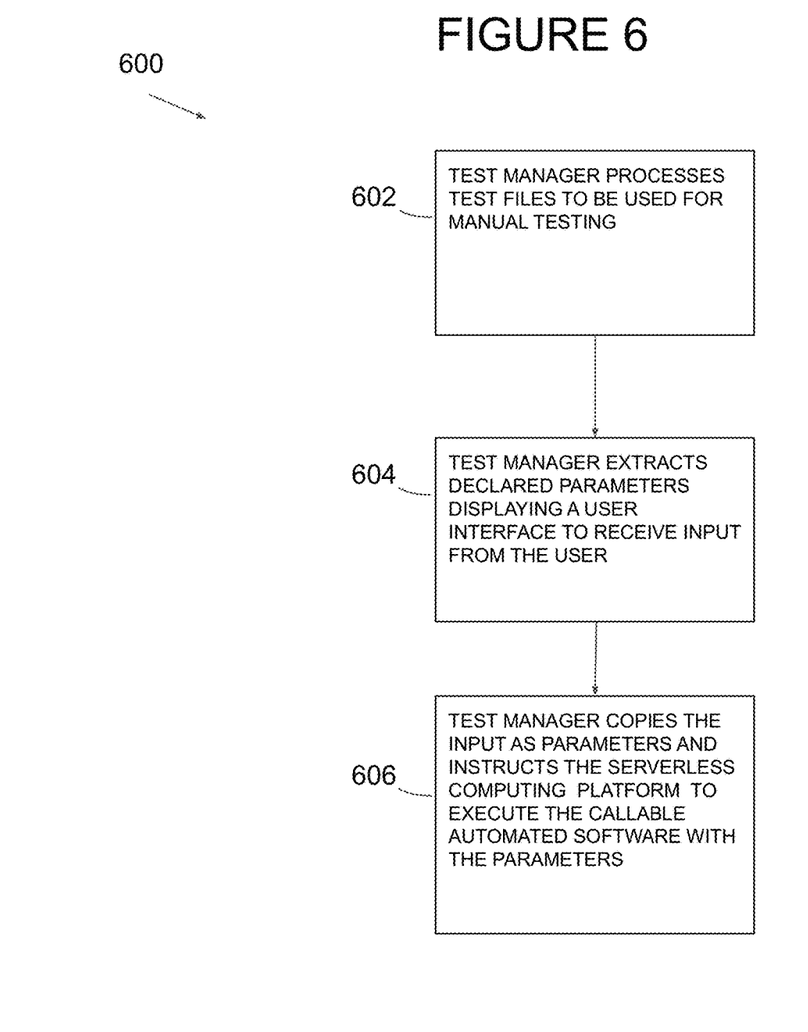

FIG. 6 is a flowchart illustrating a test execution process of callable automated software with user entered parameters. The flow includes a test retrieved from the version control hosting service 102 with defined software automation that include declared parameters within the test file and/or the test manager's user interface configuration (FIG. 3A) 360. A user can during the execution of the manual test enter in input parameters (FIG. 4A) 418 to be associated with the callable software automation. The test manager 100 extracts the parameters and provides the information as input parameters to be used for controlling the behavior of the automated software being executed by the serverless computing platform 104.

Starting at step 602, the test manager 100, in one embodiment, utilizing the API of the version control hosting service 102, extracts a copy of the test files 120 in the repository 122.

Next at step 604, the test manager 100, identifies the defined parameters declared or referenced via external file within the text file and/or configured within the user interface 360 and presents a user interface (FIG. 4A) 418 to the human tester to receive input values.

Continuing to a step 606, the test manager 100, copies the user provided input and uses them as input parameters to control the callable automated software being executed by the serverless computing platform 104.

In one embodiment, when a manual test requires callable automation software to be executed by an serverless computing platform, parameters declared within the test manager 100 configuration (FIG. 3A) 360 and/or within the test file, can use dynamic data values. Dynamic data values can be resolved during test execution runtime by the test manager 100. Set forth below is a certain exemplary test that may be used to define test steps including both manual steps and callable automated software, whereas the input leverages dynamic data values, that requires the test manager 100 to resolve the values dynamically during runtime and use the values as parameters for the callable automated software to be executed by the serverless computing platform 104.

```
# MY TEST
This test covers very important stuff.
FIRST CHECK THIS
Verifies that stuff comes up as expected
- <ran::turnOn-gadget>
    {
        "this": "hey",
        "who": ${{tester.name}}
    }
    output:
        status:
        count:
- Now check if gadget is online
- <run::turnUp-gadget>
    {
        "newcount": ${{turnOn-gadget.output.count}},
        "who": ${{tester.name}}
    }
- Determine if gadget dashboard displaying "OK"
```

The character sequence ${{tester.name}} references a defined dynamic data value that is supported by the test manager 100 and is to be associated with the parameter named "who." This example has the test manager 110 determine the user's name executing the test and provides the name as the value of the "who" field. Another example is using the output of a called automated software as input to another callable automated software. The character sequence ${{turnOn-gadget.output.count}} references a defined dynamic data value that is resolved by the test manager and is used as input to a subsequent callable automated software. There are no limits to the number of dynamic data values supported by the test manager. The characters and keywords used for instructions are examples only and other techniques may be used.

Figure 7:
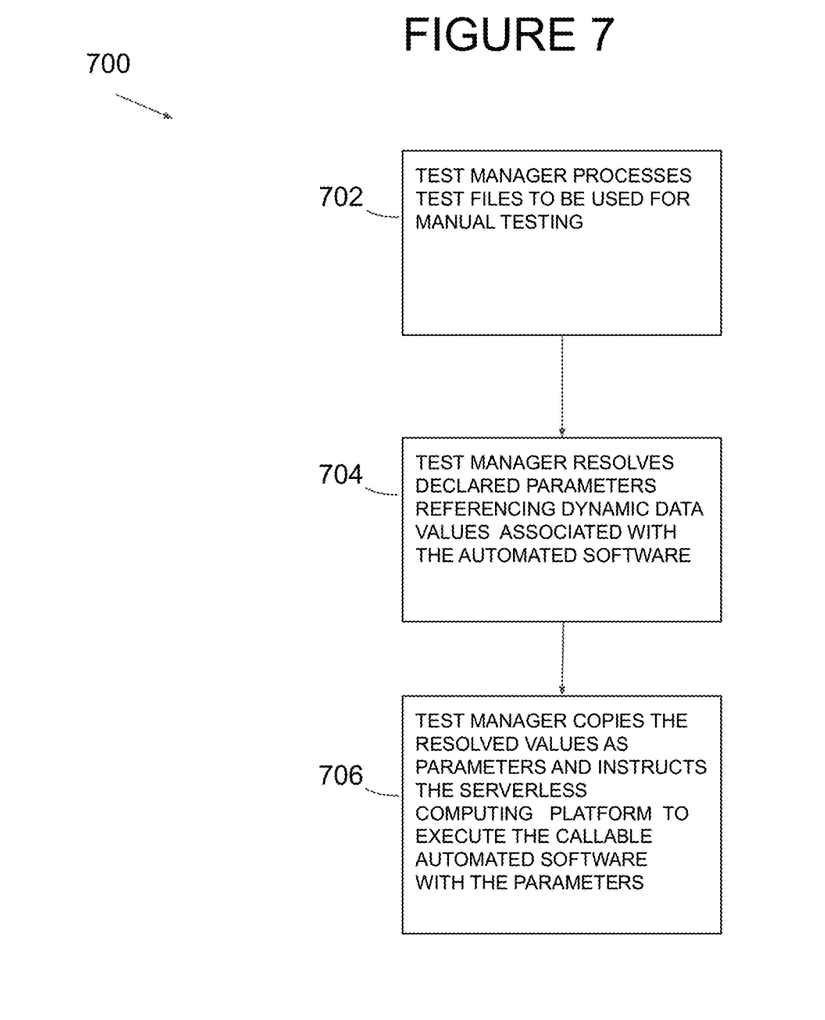

FIG. 7 is a flowchart illustrating a test execution process of callable automation software with parameters using dynamic data values. The flow includes a test file retrieved from the version control hosting service 102 with defined callable automated software that includes declared parameters within the text file using dynamic data values as parameters. Another method available is extraction of the parameters from the test manager's user interface configuration (FIG. 3A) 360, where parameters using dynamic data values can also be defined, associated with the callable automated software. The test manager 100 extracts the parameters, determines the values during runtime, and provides the resolved values as input parameters to be used for controlling the behavior of the automated software being executed by the serverless computing platform 104.

Starting at step 702, the test manager 100, in one embodiment, utilizing the API of the version control hosting service 102, extracts a copy of the test files 120 in the repository 122.

Next at step 704, the test manager 100, identifies and copies the defined parameters declared within the text file and/or within the user interface configuration. For parameters referencing dynamic data values, they are resolved during execution and associated with the input field names.

Continuing to a step 706, the test manager 100, copies the resolved dynamic data values and provides them as input parameters to control the automated software being executed by the serverless computing platform 104.

Instructions or code utilized by or for the testing application 100 may be written in any programming language such as but not limited to C, C++, BASIC, Pascal, or Java. The functions of the testing application 100 may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

What is claimed is:

1. A system for executing tests for a system under test, comprising:
   a processor; and
   a test manager, executing on the processor, the test manager configured to be notified in response to the creation of a test project, and configured to identify one or more files containing plain text instructions that are stored and maintained by a version control hosting service, the test instructions to be executed as a manual test by a human tester on the system under test, the test manager also configured to receive automation descriptors used to communicate with a serverless computing platform to execute automated software to place the system under test in a predefined state,
   the test manager configured to display a user interface having information indicating the manual test to be executed and providing guiding instructions for the test execution of the system under test, the test manager having a user interface including one or more actuatable triggers for the human tester to instruct the test manager to communicate with the serverless computing platform to execute automated software to place the system under test in the predefined state, the user interface also configured to receive status information from the human tester and the serverless computing platform.

2. The system of claim 1, wherein the test manager receives instructions to sequence a presentation of the one or more actuatable triggers, the received instructions being from the manual test instructions and/or persisted instructions received via the user interface, the received instructions to sequence the actuatable triggers at the beginning, during, or after the human tester executes the manual test on the system under test.

3. The system of claim 2, wherein the received actuatable triggers identify one or more parameters that are used for directing the execution of automated software, the test manager using the parameters to control the behavior of the automated software executed by the serverless computing platform.

4. The system of claim 3, the test manager configured to display a user interface to receive values from the human tester as input for the parameters used for controlling the behavior of the automated software.

5. The system of claim 3, wherein the test manager is further configured to resolve dynamic data values during the runtime execution of the manual test as input for the parameters used for controlling the behavior of the automated software.

6. The system of claim 1, wherein the test manager communicates with the version control hosted service and the serverless computing platform via an external application programming interface that is exported by each of the respective services.

7. The system of claim 1, wherein services of the test manager, the version control hosting service, and the serverless computing platform are integrated together within a single application.

8. A method for executing tests for system under test, comprising:
   receiving notification in response to the creation of a test project;
   identifying one or more files containing plain text instructions that are stored and maintained by a version control hosting service, the test instructions to be executed as a manual test by a human tester on the system under test;
   receiving at least one automation descriptor used to communicate with a serverless computing platform to execute automated software to place the system under test in a predefined state;
   displaying a user interface having information indicating the manual test to be executed and providing guiding instructions for the execution of the tests;
   communicating with the serverless computing platform to execute the automated software to place the system under test in the predefined state; and
   receiving status information from the human tester and the serverless computing platform.

9. The method of claim 8, further comprising receiving instructions to sequence a presentation of the one or more actuatable triggers, the received instructions being from the text instructions and/or persisted instructions received via a user interface, the received instructions to sequence the actuatable triggers at the beginning, during, or after the human tester executes the manual test on the system under test.

10. The method of claim 9, wherein the actuatable triggers identify one or more parameters that are used for directing the execution of automated software, using the parameters to control the behavior of the automated software executed by the serverless computing platform.

11. The method of claim 10, wherein received user input identified as values for the parameters used for controlling the behavior of automated software.

12. The method of claim 8, wherein the text instructions are received via an external application programming interface that is exported by the version control hosting service.

13. A program storage device storing instructions that when executed performs the method comprising:

receiving notification in response to the creation of a test project;

identifying one or more files containing plain text instructions that are stored and maintained by the version control hosting service, the test instructions to be executed as a manual test by a human tester on system under test;

receiving automation descriptors used to communicate with a serverless computing platform to execute automated software to place the system under test in a predefined state;

displaying a user interface having information indicating the manual test and providing guiding instructions for the execution of the test;

communication with a serverless computing platform to execute the automated software to place the system under test in the predefined state; and receiving status information from the human tester and the serverless computing platform.

14. The program storage device of claim 13, further comprising instructions to execute automated software as part of the manual test.

15. The program storage device of claim 13, wherein receive automation descriptors used to communicate with the serverless computing platform hosting the automated software.

16. The program storage device of claim 13, wherein received instructions identify parameters that are used for the execution of automated software, the test manager using the parameter to control the execution of the automated software by the serverless computing platform.

17. The program storage device of claim 13, further comprising instructions for communicating with the version control hosting service via an external application programming interface.

* * * * *